United States Patent Office.

ALEXIUS RÄDER, OF CHRISTIANIA, NORWAY.

SOLDERING METAL FOR ALUMINIUM.

SPECIFICATION forming part of Letters Patent No. 476,896, dated June 14, 1892.

Application filed January 19, 1892. Serial No. 418,575. (No specimens.)

*To all whom it may concern:*

Be it known that I, ALEXIUS RÄDER, a subject of the King of Sweden and Norway, and a resident of Christiania, Norway, have invented certain new and useful Improvements in Soldering Metal for Aluminium, of which the following is a full and clear description.

The objects of my invention are to provide a soldering metal which shall be durable and cheap, which can be used with the ordinary soldering-bolt, which is easily made, is of very light weight, which is capable of receiving a high polish, and possesses no poisonous ingredients.

With these objects in view my invention consists in combining cadmium, zinc, and tin mixed in substantially the following proportions, viz: cadmium, fifty parts; zinc, twenty parts; tin, the remainder. I mix these metals as follows: The zinc is first melted in any suitable vessel, then the cadmium is added, and then the tin in pieces is added. The whole mass must be well heated, stirred, and then poured out.

This soldering metal can be used for a variety of different metals, but is especially adapted to aluminium.

The proportions of the various ingredients may be varied in accordance with the use to which the article is to be put. For instance, where a strong and tenacious soldering is required a larger proportion of cadmium can be used. Where great adhesion is desired, a larger proportion of zinc would be used, and where a nice and durable polish is desired a greater per cent. of tin would be used.

Having thus described my invention, what I claim is—

1. The herein-described soldering metal for aluminium, consisting of zinc, cadmium, and tin mixed in substantially the proportions specified.

2. The herein-described method of making soldering metal for aluminium, consisting in melting zinc, then adding cadmium, and then adding tin in pieces, the whole mass to be stirred during the entire operation.

In witness whereof I have hereunto set my hand in presence of two witnesses.

ALEXIUS RÄDER.

Witnesses:
H. E. HEYERDAHL,
GUSTAV BITTER.